(12) United States Patent
Wang

(10) Patent No.: US 11,854,546 B2
(45) Date of Patent: Dec. 26, 2023

(54) SPEECH-CONTROLLED VANITY MIRROR

(71) Applicant: ShenZhen XinHai ChuangDa Technology Industrial Co., Ltd., Shenzhen (CN)

(72) Inventor: Xing Wang, Shenzhen (CN)

(73) Assignee: ShenZhen XinHai ChuangDa Technology Industrial Co., Ltd., Shenzhen (CN)

( * ) Notice: Subject to any disclaimer, the term of this patent is extended or adjusted under 35 U.S.C. 154(b) by 151 days.

(21) Appl. No.: 17/521,510

(22) Filed: Nov. 8, 2021

(65) Prior Publication Data
US 2022/0254342 A1    Aug. 11, 2022

(30) Foreign Application Priority Data

Feb. 5, 2021   (CN) .......................... 202120348503.3

(51) Int. Cl.
| | |
|---|---|
| *A47G 1/02* | (2006.01) |
| *G10L 15/22* | (2006.01) |
| *H04R 1/40* | (2006.01) |
| *H04R 3/00* | (2006.01) |
| *G10L 15/25* | (2013.01) |
| *G10L 21/0232* | (2013.01) |
| *H05B 47/11* | (2020.01) |

(Continued)

(52) U.S. Cl.
CPC ................ *G10L 15/22* (2013.01); *A47G 1/02* (2013.01); *G06F 3/165* (2013.01); *G06V 40/172* (2022.01); *G10L 15/25* (2013.01); *G10L 21/0232* (2013.01); *H04R 1/406* (2013.01); *H04R 3/00* (2013.01); *H05B 47/11* (2020.01); *A47G 2200/085* (2013.01); *A47G 2200/143* (2013.01); *A47G 2200/146* (2013.01); *G10L 2015/223* (2013.01); *G10L 2021/02165* (2013.01); *H04R 2430/01* (2013.01)

(58) Field of Classification Search
CPC ........... H03G 3/20; G10L 15/20; G10L 17/00; G10L 15/22; A47G 1/02
USPC .................................. 381/110; 704/231, 246
See application file for complete search history.

(56) References Cited

U.S. PATENT DOCUMENTS

| | | | |
|---|---|---|---|
| 6,420,975 B1 * | 7/2002 | DeLine ................ | G06Q 20/341 381/86 |
| 2015/0104050 A1 * | 4/2015 | Harrison ................. | H04S 7/301 381/303 |

(Continued)

*Primary Examiner* — George C Monikang

(57) ABSTRACT

A speech-controlled vanity mirror is provided, which includes a vanity mirror body, a first microphone, a second microphone and a speech recognition control device provided on the vanity mirror body. The speech recognition control device includes a music control device and a speech control device. The first microphone is connected to the music control device, and transmits the audio signal acquired from a loudspeaker to the music control device. A filter in the music control device filters the audio signal to eliminate the interference of the audio played by the loudspeaker in speech instructions of the user. The second microphone is connected to the speech control device, and transmits the speech instructions of the user to the speech control device. The speech control device adjusts and controls a multifunctional device on the vanity mirror body according to the speech instructions. It is convenient for users to operate, and the recognition rate and accuracy of the speech instruction are high.

9 Claims, 1 Drawing Sheet

(51) Int. Cl.
  *G06F 3/16* (2006.01)
  *G06V 40/16* (2022.01)
  *G10L 21/0216* (2013.01)

(56) References Cited

U.S. PATENT DOCUMENTS

2018/0270410 A1* 9/2018 Lyle .................... H04N 23/51
2019/0339936 A1* 11/2019 Brahimi ................ G10L 15/22

* cited by examiner

SPEECH-CONTROLLED VANITY MIRROR

TECHNICAL FIELD

The present disclosure relates to the field of vanity mirror technologies, in particular to a speech-controlled vanity mirror.

BACKGROUND ART

Traditional vanity mirrors generally each include a mirror surface and a base for supporting the mirror surface, which only has a single function convenient for users to make up and tidy up their appearance. However, with the development of science and technology, users may have more needs in the process of makeup. In order to meet the needs of the users, it is necessary to design a multifunctional vanity mirror which can be easily manipulated.

SUMMARY

The present disclosure provides a speech-controlled vanity mirror, which is used for solving the problem that the vanity mirror in the prior art has a single function and cannot meet various demands of current users.

The present disclosure provides a speech-controlled vanity mirror, which includes a vanity mirror body, a first microphone, a second microphone and a speech recognition control device which are provided on the vanity mirror body; where the speech recognition control device includes a music control device and a speech control device; the first microphone is connected to the music control device, the first microphone transmits an audio signal acquired from a loudspeaker to the music control device, and a filter in the music control device filters the audio signal to eliminate interference of audio played by the loudspeaker in speech instructions of an user; the second microphone is connected to the speech control device, the second microphone acquires and transmits the speech instructions of the user to the speech control device, and the speech control device adjusts and controls a multifunctional device on the vanity mirror body based on the speech instructions.

Preferably, the music control device includes a self-adapting filter; the first microphone is connected to the self-adapting filter of the music control device.

Preferably, the music control device further includes a volume control device; the volume control device is connected to a volume switch of the loudspeaker, and adjusts and controls the volume switch; an adjustment and control mode of the volume switch of the loudspeaker includes one or more of a volume reduction mode, a mode of reducing volume to minimum, a mode of turning off the volume switch, or a combination thereof.

Preferably, the multifunctional device is connected to the speech control device; the multifunctional device includes one or more of a Bluetooth speaker, a light source and a light adjustment device, a multifunctional storage box, a camera, a mirror cleaner, a speech interaction device and a speech attention device, or a combination thereof; any one device in the multifunctional device is connected to the speech control device.

Preferably, the speech-controlled vanity mirror further includes an infrared sensing device provided on the vanity mirror body; wherein the infrared sensing device is connected to a switch of the light source in the multifunctional device.

Preferably, the speech-controlled vanity mirror further includes touch buttons and/or mechanical buttons provided on the vanity mirror body; wherein a mode of turning on, turning off, and adjusting the multifunctional device includes a touch button mode and/or a mechanical button mode.

Preferably, the light source is installed on a side of a mirror box of the vanity mirror body, and a light transmission area of a mirror surface of the vanity mirror body transmits light; the light adjustment device is connected to the light source, and adjusts on and off, a color, a mode and brightness of the light; when natural light is detected, the light adjustment device automatically adjusts the color, the mode and the brightness of the light based on intensity of the natural light.

Preferably, the camera is provided above the mirror surface of the vanity mirror body, and performs face recognition on the user by acquiring face information.

Preferably, the speech instructions includes a shortcut instruction; the second microphone acquires and transmits the shortcut instruction to the speech control device, and the speech control device adjusts and controls the multifunctional device on the vanity mirror body based on the shortcut instruction.

Preferably, the multifunctional device includes a scene device; the scene device includes at least one scene formed by one or more of a Bluetooth speaker, a light source and a light adjustment device, a multifunctional storage box, a camera, a mirror cleaner, a speech interaction device, a speech attention device, or a combination thereof; the scene device is provided with a plurality of scenes of the at least one scene, and each of the plurality of the scenes corresponds to a corresponding one of the speech instructions.

The present disclosure provides a speech-controlled vanity mirror. The speech-controlled vanity mirror provided the present disclosure is used by a user to adjust and control the vanity mirror and the multifunctional device thereof in a speech instruction manner, which is convenient for the user to operate in a speech-control mode and can avoid the miss operation. In addition, the speech-control mode can also save the operation time of the user, and the space distance for the operation of the user is not limited either. Therefore, the speech-control mode is used to improve the user experience as a whole. On the other hand, two microphones are used to acquire the audio played in the loudspeaker, and the music control device filters the audio signals acquired by the microphones to eliminate the interference of the audio played by the loudspeaker in the speech instruction of the user. When the user gives the speech instruction, the audio played in the loudspeaker is a noise signal with respect to the speech instruction, which needs to be offset to guarantee to leave a relatively clean sound that is the speech instruction from the user. In this way, it can ensure that the wake-up instruction from the user can be recognized at any time when the loudspeaker plays music, and the recognition accuracy is higher without any noise.

Other features and advantages of the present disclosure will be set forth in the following description, and in part will be obvious from the specification, or may be learned by practice of the present disclosure. The objects and other advantages of the present disclosure can be realized and obtained by the structure particularly pointed out in the written specification, claims, and drawings.

The technical scheme of the present disclosure will be further described in detail by the following drawings and embodiments.

BRIEF DESCRIPTION OF THE DRAWINGS

The drawings are used to provide a further understanding of the present disclosure and form a part of the specification, and are used to explain the present disclosure together with the embodiments of the present disclosure, without forming a limitation on the present disclosure. In the drawings.

DETAILED DESCRIPTION OF THE EMBODIMENTS

Hereinafter, the preferred embodiments of the present disclosure will be described with reference to the accompanying drawings. It should be understood that the preferred embodiments described here are only used to illustrate and explain the present disclosure, without limiting the present disclosure.

Embodiment 1

Figure 1:
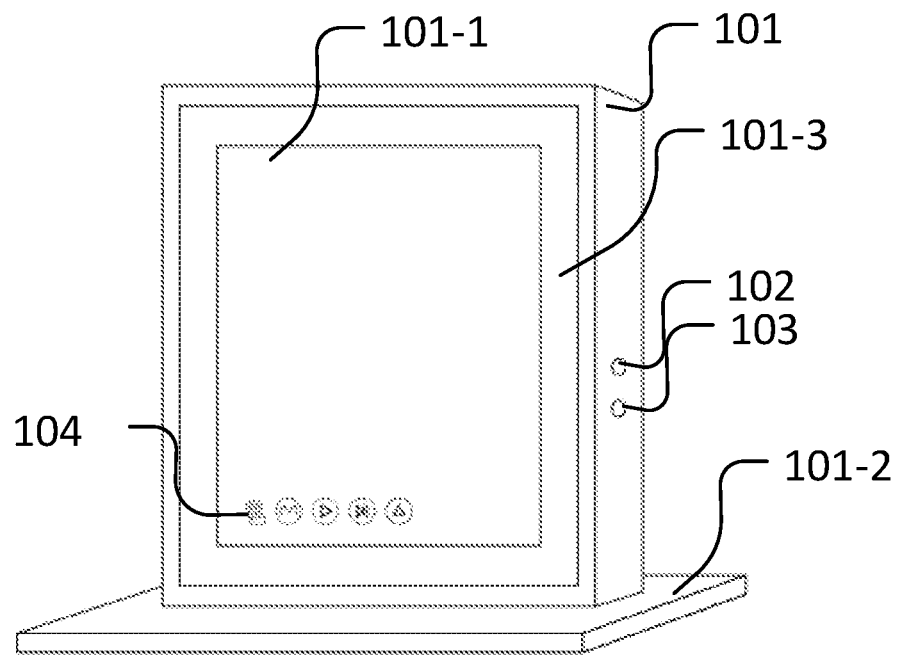
FIG. 1 is a schematic diagram of a front structure of a speech-controlled vanity mirror according to an embodiment of the present disclosure.
Figure 2:
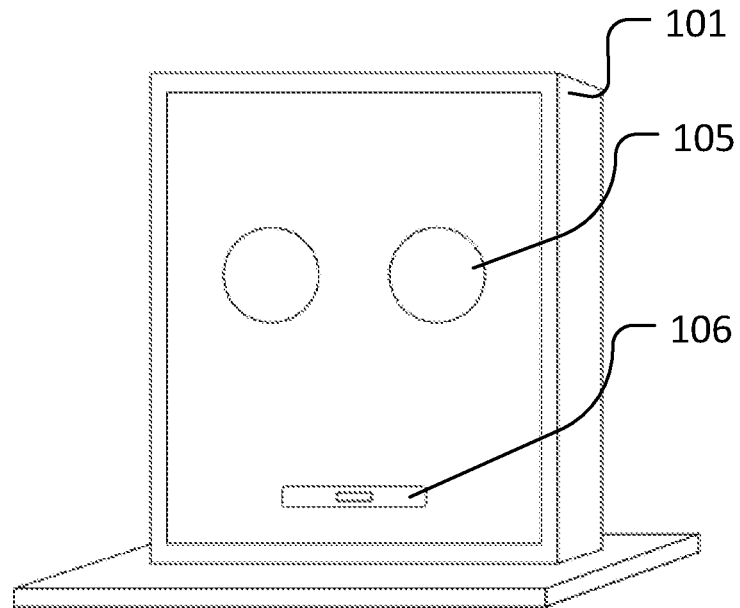
FIG. 2 is a schematic diagram of a back structure of the speech-controlled vanity mirror according to an embodiment of the present disclosure.

An embodiment of the present disclosure provides a speech-controlled vanity mirror. FIG. 1 is a schematic diagram of a front structure of a speech-controlled vanity mirror according to an embodiment of the present disclosure. FIG. 2 is a schematic diagram of a back structure of a speech-controlled vanity mirror according to an embodiment of the present disclosure. Referring to FIGS. 1 and 2, the speech-controlled vanity mirror includes: a vanity mirror body 101, a first microphone 102, a second microphone 103 and a speech recognition control device provided on the vanity mirror body.

The first microphone 102 is connected to the music control device. The first microphone 102 acquires and transmits an audio signal of a loudspeaker to the music control device. A filter in the music control device filters the received audio signal to eliminate the interference of the audio played by the loudspeaker in speech instructions of the user.

The second microphone 103 is connected to the speech control device. The second microphone 103 acquires and transmits a speech instruction of the user to the speech control device, and the speech control device adjusts and controls a multifunctional device on the vanity mirror body based on the received speech instruction.

The working principle and beneficial effects of the above technical scheme are as follows: a speech recognition device is added to the vanity mirror body of the speech-controlled vanity mirror provided in this embodiment. The vanity mirror can be adjusted and controlled correspondingly by a speech instruction mode based on a speech recognition technology.

Specifically, the vanity mirror body includes a mirror surface 101-1 and a support frame 101-2 for supporting the mirror surface.

Two microphones and the speech recognition control device are provided on the vanity mirror body.

There can be two microphones. One microphone can be used to acquire the audio signal of the loudspeaker 105. The corresponding processing is performed according to the audio signal, so that the speech control device can eliminate all noise signals except for the speech instruction of the user.

At this time, the audio played in the loudspeaker 105 also belongs to a type of noise information. That is, music or other audio can be played in the loudspeaker 105 when the user does not give a speech instruction. At this time, the audio played in the loudspeaker 105 is not a noise signal. The audio played in the loudspeaker 105 is a noise signal with respect to the speech instruction only when the user gives a speech instruction, which needs to be offset to guarantee to leave a relatively clean sound that is the speech instruction from the user. In this way, it can ensure that the wake-up instruction from the user can be recognized at any time when the loudspeaker 105 plays music, and the recognition accuracy is higher without any noise.

Therefore, the audio signals acquired by this microphone are processed by the music control device, that is, the music control device filters the audio signals acquired by the microphone, so as to eliminate the interference of the audio played by the loudspeaker 105 in the speech instruction of the user.

In addition, the other microphone of the two microphones is used to acquire the speech instruction of the user, and the speech control device can perform corresponding function adjustments on the multifunctional device of the vanity mirror according to the speech instruction.

The scheme provided in this embodiment uses the structure of two microphones. According to actual needs, a plurality of microphones can also be provided, as long as at least one microphone can acquire the audio signal of the loudspeaker 105. As long as the audio signal in the loudspeaker 105 is acquired and filtered by the music control device, the interference of the audio in the loudspeaker 105 in the speech instruction can be avoided when the user issues the speech instruction. Therefore, three or more microphones can also be provided to meet specific needs.

The multifunctional device is a device with a plurality of functions loaded on the vanity mirror body. The multifunctional device can meet the requirements of the user for various behaviors when using the vanity mirror of this embodiment. The multifunctional device is controlled through a speech-control mode. Therefore, although a plurality of functions are added, it is relatively simple for the user to operate, the miss operation is not easy to occur, and the requirements of the user are fully met.

It should be noted that the multifunctional device can include functions required by various scenes. For example, the multifunctional device can include a Bluetooth speaker, a speech attention device, a speech interaction device, and other functions that can be used conveniently by users. The specific functions that can be realized by the multifunctional device are introduced and explained in detail in the following content.

To sum up, the speech-controlled vanity mirror provided the present disclosure is used by a user to adjust and control the vanity mirror and its multifunctional device in a speech instruction mode, which is convenient for the user to operate in a speech-control mode and can avoid the miss operation. In addition, the speech-control mode can also save the operation time of the user, and the space distance for the operation of the user is not limited either. Therefore, the speech-control mode is used to improve the user experience as a whole. On the other hand, in this embodiment, two microphones are used to acquire the audio played in the loudspeaker, and the music control device filters the audio signals acquired by the microphones to eliminate the interference of the audio played by the loudspeaker in the speech instruction of the user. When the user gives the speech instruction, the audio played in the loudspeaker is a noise signal with respect to the speech instruction, which needs to be offset to guarantee to leave a relatively clean sound that is a speech instruction from the user. In this way, it can ensure that the wake-up instruction from the user can be recognized at any time when the loudspeaker plays music, and the recognition accuracy is higher without any noise.

Embodiment 2

On the basis of Embodiment 1, the music control device includes a self-adapting filter.

The first microphone is connected to the music control device, and further the first microphone is connected to the self-adapting filter of the music control device.

The working principle and beneficial effects of the above technical scheme are as follows. The music control device filters the received audio signal, which includes: when the speech control device detects a speech instruction, through the self-adapting filter, the music control device filters the audio signal, an acoustic echo signal and a circuit echo signal; and when the speech control device does not detect a speech instruction, through the self-adapting filter, the music control device filters the acoustic echo signal and the circuit echo signal.

By using the scheme provided by this embodiment, the speech control device determines whether a speech instruction is acquired by the microphones. When the speech instruction is detected, it is necessary to perform noise reduction processing on all sounds except for the speech instruction, so as to increase the recognition accuracy of the speech instruction.

Even if no speech instruction is detected, the music control device can also filter the acoustic echo signal and the circuit echo signal in order to reduce various noises.

In the current digital communication network, a conversion mixer is integrated together with the digital-to-analog converter. However, no matter whether it is an analog electronic circuit or a digital electronic circuit, the conversion of two wires/four wires may result in the impedance mismatch, which will lead to generate the circuit echo and affect the modern communication quality. Because of the linearity and the stability of the circuit echo, a simple linear superimposer can eliminate the circuit echo.

As for the acoustic echo signal, as the acoustic echo signal is nonlinear, the self-adapting filter can be used for echo cancellation. The iterative updating coefficients of the filter are adjusted by the adaptive algorithm, and an expected signal is estimated, which is approximate to the echo signal passing through the actual echo path, that is, to cancel the simulated echo signal. The simulated echo is then subtracted from the mixed signal acquired by the microphone to achieve the function of echo cancellation.

The coefficients of the self-adapting filter are automatically adjusted according to the iterative updating principle. A calculation scheme of the self-adapting filter is provided by this embodiment, and combines the LSM algorithm, so as to filter the audio signal, the acoustic echo signal and the circuit echo signal acquired in the loudspeaker, which effectively reduces noise when necessary. Specifically, based on the estimation of the statistical characteristics of the input and output signals, the filter coefficients are automatically adjusted in this manner to achieve the best filtering effect.

Therefore, in the scheme provided in this embodiment, the music control device is used to filter the audio signals acquired by the first microphone to eliminate the interference of the audio played by the loudspeaker in the speech instruction of the user. When the user gives the speech instruction, the audio played in the loudspeaker is a noise signal with respect to the speech instruction, which needs to be offset. In this way, it ensures that a relatively clean sound that is the speech instruction from the user is left, thereby realizing that the wake-up instruction issued by the user can be recognized at any time when the loudspeaker plays music, and enabling the recognition accuracy to be higher without any noise.

Embodiment 3

On the basis of Embodiment 2, the music control device further includes a volume control device. The volume control device is connected to the volume switch of the loudspeaker, and adjusts and controls the volume switch.

The adjustment and control mode of the volume switch of the loudspeaker includes one or more of a volume reduction mode, a mode of reducing volume to minimum, a mode of turning off the volume switch, or a combination thereof.

The working principle and beneficial effects of the above technical scheme are as follows: when the music control device uses the self-adapting filter to filter the audio signal, the acoustic echo signal and the circuit echo signal, the volume control device in the music control device is connected to the volume switch of the loudspeaker, so as to adjust and control the volume switch.

This embodiment is an optimization of the scheme provided in Embodiment 2. Specifically, in order to ensure that the speech instruction can be detected and acquired by the speech control device more clearly and accurately after the noise signal is processed by the filter, a further scheme can be implemented after filtering. For example, the volume control device of the music control device is connected to the volume switch of the loudspeaker, and can control the volume switch and the adjustment of the volume. The mode of controlling the volume switch includes the mode of reducing the volume, the mode of reducing the volume to minimum, and the mode of turning off the volume switch. Through any of the above three modes, the environmental noise can be further reduced to ensure that the speech instruction can be received in a quiet environment.

It should be noted that a noise or a noise signal is a relative concept in the present disclosure, which is relative to the speech instruction issued by the user. All other sounds are enabled to be set as the noise when a speech instruction exists, and various methods are used to eliminate the noise, so as to keep a clean speech-control instruction. Therefore, the scheme provided by this embodiment can ensure the quietness of the environment to the greatest extent, and provide a good environmental basis for detecting and receiving the speech-control instruction. On this basis, the speech recognition control device can more accurately receive the speech instruction, and adjust and control the multifunctional device according to the speech instruction.

Embodiment 4

On the basis of Embodiment 1, the multifunctional device is connected to the speech control device; and the multifunctional device includes one or more of a Bluetooth speaker, a light source and a light adjustment device, a multifunctional storage box, a camera, a mirror cleaner, a speech interaction device, a speech attention device, or a combination thereof. Any one of the multifunctional devices is connected to the speech control device.

The working principle and beneficial effects of the above technical scheme are as follows: the scheme provided by this embodiment provides a variety of functional characteristics for the speech-controlled vanity mirror to meet different needs of the user.

The multifunctional device can include functions required by various scenes. The multifunctional device will be briefly introduced and explained hereinafter.

The Bluetooth speaker is connected to the music control device. The music control device can control the volume of the speaker, and a switch and a volume adjusting button are further provided outside the speaker. The Bluetooth speaker is embedded in the speech-controlled vanity mirror, which can facilitate users to play music or speech in any way through the Bluetooth. The adjustment and control of the Bluetooth speaker can include: play, stop, volume up, volume down, previous song, next song, etc., which can be freely switched. So, users can listen to music while making up, so as to relieve or adjust their mood, and meet the needs of the user for listening to music at any time.

The light source and the light adjustment device are necessary devices of the current vanity mirror, and the best make-up face can be displayed only when the make-up is performed under the suitable light. Therefore, the light source and the light adjustment device on the vanity mirror are extremely important. The light source is an annular or square light band arranged along the periphery of the mirror surface. The light adjustment device is provided on the mirror surface of the vanity mirror. The light adjustment device can adjust the mode or color change of lights, such as the switching of yellow light, white light and natural light, and can also adjust the brightness of lights.

The multifunctional storage box is a storage device provided on the tabletop of the vanity mirror. The multifunctional storage box can provide a space for users to place cosmetic articles and a space for users to place personal articles such as mobile phones. When the multifunctional storage box provides a space for users to place cosmetic articles, the storage box can set a special space suitable for placing cosmetic articles, and the layout of the space is set according to the specific shape and characteristics of cosmetic articles.

The camera can be a camera installed on a mirror surface. The camera can be turned on to take a self-photo or take a video for the user. The photo or video can be displayed through a display screen provided on the mirror surface, or can be connected to a mobile phone through Bluetooth function and displayed on the screen of the mobile phone. Therefore, the camera is provided to free both hands of users to a certain extent, and to check whether the make-up face is photogenic.

The mirror cleaner is provided at the bottom of the mirror surface, and provides cleaning operation for the mirror surface of the vanity mirror. The mirror cleaner can perform clean operation regularly to ensure the cleanness of the mirror surface.

The speech interaction device is connected to the speech control device, and the speech control device can adjust and control the speech interaction device. The speech interaction device is equivalent to a speech assistant, and the manner of providing a radio for receiving sounds and a loudspeaker for amplifying sounds are adopted. So, the speech interaction device can talk with the user through networking, thereby solving the questions of the user or providing some speech reminders for the user. The speech interactive device can increase the interest and reasonably control the boring time of the user in the make-up process.

The speech attention device is connected to the speech control device, and the speech control device can adjust and control the speech attention device. The speech attention device gives speech provides speech attention for the user through a loudspeaker in a speech broadcast manner. The attention can be a reminder trip set by the user in advance or a preset speech broadcast of weather and other information for the user every day.

The above-mentioned multi-functional device may exist alone, or may consist of several devices, or may be a combination of all the above-mentioned devices. By providing the above-mentioned device, the practical and entertaining requirements of the user in the make-up process can be met.

Embodiment 5

On the basis of Embodiment 4, an infrared sensor provided on the vanity mirror body is further included. When the infrared sensing device detects that the user is at the make-up position, the light source is controlled to be turned on.

The working principle and beneficial effects of the above technical scheme are as follows. The infrared sensing device is provided to judge whether the user needs to use the vanity mirror. When it is detected that the user is at the make-up position, the make-up position generally means that the user is sitting on a stool in front of the vanity mirror, which means that the user needs to use the vanity mirror. In this situation, the light source is turned on via the induction and judgment of the infrared sensing device to facilitate the user to use the vanity mirror. With the above scheme, automatic operation can be realized to a certain extent. When the user needs to use the vanity mirror, it is not necessary to manually turn on the light switch every time, and the user only needs to sit in front of the vanity mirror to automatically turn on the light source. Therefore, the user needs can be met to a certain extent, and the user experience can be improved.

Embodiment 6

On the basis of Embodiment 4, touch buttons and/or mechanical buttons provided on the vanity mirror body are further included. The multifunctional device is turned on, turned off, and adjusted and controlled by using the following modes: a touch button mode and/or a mechanical button mode.

The working principle and beneficial effects of the above technical scheme are as follows: the switch of the multifunctional device and the adjustment of various parameters or performances can be adjusted in a touch mode, and the control of the multifunctional device can be realized through the touch buttons 104 provided on the mirror surface 101-1.

In addition to the touch mode, the multifunctional device can also be controlled by mechanical buttons. Although mechanical buttons do not have a high-tech sense as touch buttons, mechanical buttons generally do not occur the failure within their service life. In order to ensure the reliability of adjustment and control, both touch buttons and mechanical buttons can be provided. It adopts a double-safety mode that both touch buttons and mechanical buttons can be performed simultaneously, so as to ensure the real-time adjustment and control of the multifunctional device.

Embodiment 7

On the basis of Embodiment 4, the light source is installed on sides of the mirror box of the vanity mirror body 101, and light is transmitted through the light transmission area of the mirror surface. The light adjustment device is connected to the light source and adjusts on/off, a color, a mode and brightness of the light. When natural light is detected, the light adjustment device automatically adjusts the color, the mode and the brightness of the light according to the detected natural light intensity.

The working principle and beneficial effects of the above technical scheme are as follows. In the scheme provided by this embodiment, the light source is installed on the sides of the mirror box of the vanity mirror body 101, and the light is transmitted through the light transmission area of the mirror surface. That is, the light transmission mirror surface 101-3 is provided the periphery of the mirror surface, and the light in the mirror box is transmitted through the light transmission area formed by the light transmission mirror surface.

The light source provided in the above manner can make the light uniformly distributed to the greatest extent, and provide the best lighting effect for users.

The light adjustment device is used for adjusting the on/off, the color, the mode and the brightness of the light, and the mode adjustment includes the switching of yellow light, white light and natural light, etc.

In addition, the light adjustment device automatically adjusts the color, the mode and the brightness of the light according to the detected natural light intensity. A light sensor can be provided to detect natural light. The color, the mode and the brightness of the light can be automatically adjusted according to the detection result, thereby realizing full automation of light adjustment.

Embodiment 8

On the basis of Embodiment 4, the camera is provided above the mirror surface of the vanity mirror body, and performs face recognition on the user by acquiring face information.

The working principle and beneficial effects of the above technical scheme are as follows: the scheme provided in this embodiment is optimized on the basis of Embodiment 5.

The camera can be a camera installed on a mirror surface. The camera can be turned on to take a self-photo or take a video for the user. The photo or video can be displayed through a display screen provided on the mirror surface, or can be connected to a mobile phone through Bluetooth function and displayed on the screen of the mobile phone. Therefore, the camera is provided to free both hands of users to a certain extent, and to check whether the make-up face is photogenic.

The camera performs face recognition on the user by acquiring face information, and automatically adjusts the color, the mode and the brightness, which are suitable for the user, of the light according to different users. The camera can record the face information of the user, and determine the most suitable lighting mode for each user by recognizing the faces of different users. When the corresponding lighting mode is determined through the face recognition on the user, fine adjustments to the light is also be performed according to the current specific situation. Through the above scheme, the frequency of light adjustment can be reduced, time can be saved for users, and the user experience can be improved.

The speech interaction device can be provided on the sides of the vanity mirror body or on the supporting frame of the vanity mirror body. The input end of the speech interaction device is connected to the speech recognition control device. According to the attention requirement preset by the user, the user is reminded in a speech broadcast manner at the corresponding time. Specifically, the speech interaction device is equivalent to a speech assistant, and can talk with the user through networking, thereby solving the questions of the user or providing some speech reminders for the user. The speech interactive device can increase the interest and reasonably control the boring time of the user in the make-up process.

In addition, a power supply device 106 may be provided on a back surface of the speech-controlled vanity mirror for supplying power to the speech recognition control device.

Embodiment 9

On the basis of Embodiment 1, the speech instruction includes a shortcut instruction; the second microphone transmits the acquired shortcut instruction to the speech control device, and the speech control device adjusts and controls the multifunctional device on the vanity mirror body according to the received shortcut instruction.

The working principle and beneficial effects of the above technical scheme are as follows. The speech control device includes a storage unit, and the storage unit stores a shortcut instruction, and the adjustment and the control for function corresponding to the shortcut instruction. When a user speaks a shortcut instruction, the speech control device is used for inquiring the adjustment and the control for function corresponding to the shortcut instruction in the storage unit according to the shortcut instruction, and adjusting and controlling the corresponding function according to the shortcut instruction.

The scheme provided by this embodiment is used to provide convenience for the user, and the speech instruction is simplified to form the shortcut instruction. For example, the storage unit stores number 1 corresponding to turning on the light, number 2 corresponding to turning on the Bluetooth speaker, number 3 corresponding to turning off the Bluetooth speaker, etc. The user does not need to issue a speech instruction such as "turning on the light", and only needs to speak number 1, so that the speech-controlled vanity mirror can turn on the light source. Therefore, the scheme provided by this embodiment provides convenience for users to a great extent.

Embodiment 10

On the basis of Embodiment 1, the multifunctional device includes a scene device; the scene device includes scene(s) formed by one or more of a Bluetooth speaker, a light source and a light adjustment device, a multifunctional box, a camera, a mirror cleaner, a speech interaction device, a speech attention device, or a combination thereof; the scene device is provided with a plurality of scenes, and each scene corresponds to a corresponding speech instruction.

The working principle and beneficial effects of the above technical scheme are as follows. The scheme provided by this embodiment is to preset scenes, and according to different scene requirements, the corresponding adjustment and the control for function can be turned on. The speech control device can start or close the scene according to the speech instruction of the user. For example, a following scene is set: the light source is turned on, the light mode is yellow light, the speaker is turned on, the speaker plays the third song, and the camera is turned on for video recording. The speech instruction corresponding to the scene is preset. For example, the instruction "scene 1 is taken" is spoken, and then the scene can be turned on.

Therefore, the scheme provided by this embodiment is used to integrate various functions into one scene. The scene can be turned on or turned off by a simple speech instruction, and various scenes can be preset, which is convenient for users to switch in various scenes.

It should be noted that the methods involved in the present disclosure, such as the control and adjustment method of various parts of a vanity mirror, the face recognition method, the light adjusting method, the speech interaction, the speech attention, etc., are all existing methods in the art. The present disclosure only improves the hardware structure of products, without improving any methods and software programs.

Obviously, those skilled in the art can make various modifications and variations without departing from the spirit and scope of the present disclosure. In this way, if these modifications and variations of the present disclosure fall within the scope of the claims and their equivalents, the present disclosure is also intended to include these modifications and variations.

What is claimed is:

1. A speech-controlled vanity mirror, comprising: a vanity mirror body, a first microphone, a second microphone, a speech recognition control device, and an infrared sensing device which are provided on the vanity mirror body; wherein
   the speech recognition control device comprises a music control device and a speech control device;
   the first microphone is connected to the music control device, the first microphone transmits an audio signal acquired from a loudspeaker to the music control device, and a filter in the music control device filters the audio signal to eliminate interference of audio played by the loudspeaker in speech instructions of an user;
   the second microphone is connected to the speech control device, the second microphone acquires and transmits the speech instructions of the user to the speech control device, and the speech control device adjusts and controls a multifunctional device on the vanity mirror body based on the speech instructions;
   the multifunctional device comprises a light source, the infrared sensing device is connected to a switch of the light source of the multifunctional device and is configured to control the connected switch of the light source.

2. The speech-controlled vanity mirror according to claim 1, wherein the music control device comprises a self-adapting filter;
   the first microphone is connected to the self-adapting filter of the music control device.

3. The speech-controlled vanity mirror according to claim 2, wherein the music control device further comprises a volume control device;
   the volume control device is connected to a volume switch of the loudspeaker, and adjusts and controls the volume switch;
   an adjustment and control mode of the volume switch of the loudspeaker comprises one or more of a volume reduction mode, a mode of reducing volume to minimum, a mode of turning off the volume switch, or a combination thereof.

4. The speech-controlled vanity mirror according to claim 1, wherein the multifunctional device is connected to the speech control device; the multifunctional device further comprises one or more of a Bluetooth speaker, a light adjustment device, a multifunctional storage box, a camera, a mirror cleaner, a speech interaction device and a speech attention device, or a combination thereof; any one device in the multifunctional device is connected to the speech control device.

5. The speech-controlled vanity mirror according to claim 4, further comprising touch buttons and/or mechanical buttons provided on the vanity mirror body;
   wherein a mode of turning on, turning off, and adjusting the multifunctional device comprises a touch button mode and/or a mechanical button mode.

6. The speech-controlled vanity mirror according to claim 4, wherein the light source is installed on a side of a mirror box of the vanity mirror body, and a light transmission area of a mirror surface of the vanity mirror body transmits light;
   the light adjustment device is connected to the light source, and adjusts on and off, a color, a mode and brightness of the light;
   when natural light is detected, the light adjustment device automatically adjusts the color, the mode and the brightness of the light based on intensity of the natural light.

7. The speech-controlled vanity mirror according to claim 4, wherein the camera is provided above a mirror surface of the vanity mirror body, and performs face recognition on the user by acquiring face information.

8. The speech-controlled vanity mirror according to claim 1, wherein the speech instructions comprises a shortcut instruction;
   the second microphone acquires and transmits the shortcut instruction to the speech control device, and the speech control device adjusts and controls the multifunctional device on the vanity mirror body based on the shortcut instruction.

9. The speech-controlled vanity mirror according to claim 1, wherein the multifunctional device comprises a scene device;
   the scene device comprises at least one scene formed by one or more of a Bluetooth speaker, the light source and a light adjustment device, a multifunctional storage box, a camera, a mirror cleaner, a speech interaction device, a speech attention device, or a combination thereof;
   the scene device is provided with a plurality of scenes of the at least one scene, and each of the plurality of the scenes corresponds to a corresponding one of the speech instructions.

* * * * *